United States Patent
Li et al.

(10) Patent No.: US 10,827,384 B2
(45) Date of Patent: Nov. 3, 2020

(54) SUBFRAME SELECTION FOR INTRODUCING SHORT TTIS IN TDD

(71) Applicant: TELEFONAKTIEBOLAGET L M ERICSSON (PUBL), Stockholm (SE)

(72) Inventors: Jingya Li, Göteborg (SE); Henrik Sahlin, Mölnlycke (SE); Mattias Andersson, Sundbyberg (SE); Gustav Wikström, Täby (SE); Niklas Andgart, Södra Sandby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/300,941

(22) PCT Filed: May 12, 2017

(86) PCT No.: PCT/IB2017/052818
§ 371 (c)(1),
(2) Date: Nov. 12, 2018

(87) PCT Pub. No.: WO2017/195172
PCT Pub. Date: Nov. 16, 2017

(65) Prior Publication Data
US 2019/0349809 A1    Nov. 14, 2019

Related U.S. Application Data

(60) Provisional application No. 62/336,014, filed on May 13, 2016.

(51) Int. Cl.
*H04W 28/06* (2009.01)
*H04L 29/08* (2006.01)

(52) U.S. Cl.
CPC .......... *H04W 28/06* (2013.01); *H04L 69/324* (2013.01)

(58) Field of Classification Search
None
See application file for complete search history.

(56) References Cited

U.S. PATENT DOCUMENTS 10,361,836 B2    7/2019   Lee et al.
10,367,621 B2    7/2019   Jiang et al.
(Continued)

FOREIGN PATENT DOCUMENTS

WO    2016064544 A1    4/2016
WO    2017151048 A1    9/2017
WO    2017155454 A1    9/2017

OTHER PUBLICATIONS

Catt, "System Analysis of DL TTI Shortening", 3GPP TSG RAN WG1 Meeting #84, R1-160739, Feb. 15-19, 2016.
Nokia et al., Considerations on shorter TTI for TDD duplex mode, 3GPP TSG RAN WG1 Meeting #84, R1-160780, Feb. 15-19, 2016.
Catt, "System Analysis of DL TTI Shortening", 3GPP TSG RAN WG1 Meeting #84, R1-160737, Feb. 15-19, 2016.
(Continued)

*Primary Examiner* — Steven H Nguyen

(57) ABSTRACT

Systems and methods are disclosed that relate to selecting Time Division Duplexing (TDD) subframes (SFs) where both downlink (DL) and uplink (UL) short Transmit Time Intervals (sTTIs) can be introduced without substantially affecting legacy TDD operations. In this regard, in some embodiments, a method of operation of a network node of a cellular communications network comprises partitioning a plurality of SFs into at least two sets of SFs. The at least two sets of SFs comprising a first set of SFs for legacy TDD transmissions and a second set of SFs for sTTI TDD transmissions. The method further comprises performing one or more telecommunications functions according to the at least two sets of SFs. In this manner, TDD sTTI transmissions can be performed without substantially affecting legacy TDD operations.

19 Claims, 7 Drawing Sheets

PARTITION SFs INTO SETS
100

↓

PERFORM TELECOMMUNICATION FUNCTION
ACCORDING TO THE SETS
102

(56) References Cited

U.S. PATENT DOCUMENTS

| | | | |
|---|---|---|---|
| 10,367,630 | B2 | 7/2019 | Byun et al. |
| 2012/0135773 | A1 | 5/2012 | Shen et al. |
| 2015/0117270 | A1 | 4/2015 | Um et al. |
| 2015/0188650 | A1 | 7/2015 | Au et al. |
| 2015/0250017 | A1 | 9/2015 | Ingale et al. |
| 2015/0333898 | A1 | 11/2015 | Ji et al. |
| 2016/0020891 | A1 | 1/2016 | Jung et al. |
| 2016/0088652 | A1 | 3/2016 | Patel et al. |
| 2016/0119948 | A1 | 4/2016 | Damnjanovic et al. |
| 2016/0249329 | A1* | 8/2016 | Au .................. H04W 72/042 |
| 2017/0188340 | A1 | 6/2017 | Andgart et al. |
| 2018/0041325 | A1 | 2/2018 | Lee et al. |
| 2018/0049165 | A1 | 2/2018 | Byun et al. |
| 2018/0199322 | A1* | 7/2018 | Takeda .................. H04J 11/00 |
| 2018/0206232 | A1* | 7/2018 | Takeda .................. H04W 28/04 |
| 2018/0255543 | A1 | 9/2018 | Takeda et al. |
| 2018/0324834 | A1 | 11/2018 | Sebire et al. |
| 2018/0332605 | A1 | 11/2018 | Pelletier |
| 2018/0359745 | A1 | 12/2018 | Yeo et al. |
| 2019/0007943 | A1 | 1/2019 | Takeda et al. |
| 2019/0036676 | A1 | 1/2019 | Takeda et al. |
| 2019/0045394 | A1 | 2/2019 | Takano |
| 2019/0069312 | A1 | 2/2019 | Oh et al. |

OTHER PUBLICATIONS

Ericsson, "Evaluation and overview of enhanced frame structure 2", 3GPP TSG RAN WG1 Meeting #84bis, R1-163325, Apr. 11-15, 2016.

Huawei et al., "Discussion on new frame structure for latency reduction in TDD", 3GPP TSG RAN WG1 Meeting #84, R1-160754, Feb. 15-19, 2016.

Panasonic, "Multiplexing between non-sTTI and sTTI UEs", 3GPP TSG RAN WG1 Meeting #84bis, R1-162535, Apr. 11-15, 2016.

3GPP TS 36/11, 13.0.0., 3rd Generation Partnership Project; Technical Specification Group Radio Access Network; Evolved Universal Terrestrial Radio Access (E-UTRA); Physical layer procedures (Release 13), Jan. 2016.

3GPP TS 36/13, 13.0.1., 3rd Generation Partnership Project; Technical Specification Group Radio Access Network; Evolved Universal Terrestrial Radio Access (E-UTRA); Physical layer procedures (Release 13), Jan. 2016.

Nokia Networks, "On required physical layer enhancements for TTI shortening", 3GPP TSG-RAN WG1 Meeting #83, R1-157294, Nov. 15-22, 2015.

Huawei et al., "Overview of short TTI", 3GPP TSG RAN WGI Meeting #84, R1-160291, Feb. 15-19, 2016.

\* cited by examiner

SUBFRAME SELECTION FOR INTRODUCING SHORT TTIS IN TDD

RELATED APPLICATIONS

This application is a national stage application of International Patent Application No. PCT/IB2017/052818, filed May 12, 2017, which claims the benefit of provisional patent application Ser. No. 62/336,014, filed May 13, 2016, the disclosure of are hereby incorporated herein by reference in their entireties.

TECHNICAL FIELD

The disclosed subject matter relates generally to telecommunications and more particularly to techniques and technologies for subframe (SF) selection for introducing short Transmit Time Intervals (TTIs) in Time Division Duplexing (TDD).

BACKGROUND

According to Technical Specification (TS) 36.211, Version 13.0.0 of the Third Generation Partnership Project (3GPP), three radio frame structures are supported by the standard. Frame structure type 1 (FS 1) is applicable to Frequency Division Duplexing (FDD) only, frame structure type 2 (FS 2) is applicable to Time Division Duplexing (TDD) only, and frame structure type 3 (FS 3) is applicable to License Assisted Access (LAA) secondary cell operation only.

With FS 2 for TDD, each radio frame of length 10 milliseconds (ms) comprises two half-frames of length 5 ms each. Each half-frame comprises five subframes (SFs) of length 1 ms. Each SF is defined by two slots of length 0.5 ms each. Within each radio frame, a subset of SFs are reserved for uplink (UL) transmissions, and remaining SFs are allocated for downlink (DL) transmissions, or for special SFs, where switching occurs between DL and UL.

As shown in Table 1, copied from 3GPP TS 36.211, version 13.0.0, seven different DL/UL configurations are supported for FS 2. In Table 1, "D" denotes a DL SF, "U" denotes an UL SF, and "S" represents a special SF. Configurations 0, 1, 2, and 6 have 5 ms DL-to-UL switch-point periodicity, with the special SF occurring in SF 1 and SF 6. Configurations 3, 4, and 5 have 10 ms DL-to-UL switch-point periodicity, with the special SF in SF 1 only.

TABLE 1

DL/UL configurations

| DL/UL configuration | DL-to-UL Switch-point periodicity | SF number 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A special SF typically comprises three parts: a DL part (DL Pilot Time Slot (DwPTS)), a Guard Period (GP), and an UL part (UL Pilot Time Slot (UpPTS)). A DwPTS with duration of more than three symbols can be treated as a normal DL SF for data transmission. However, the UpPTS is not used for data transmission due to its short duration. Instead, UpPTS can be used for channel sounding or random access.

Typically, the DL/UL configuration and the configuration of the special SF used in a cell are signaled as part of system information, which is included in System Information Block 1 (SIB1) and broadcasted every 80 ms within SF 5.

Hybrid Automatic Repeat Request (HARQ) Timing for TDD

HARQ timing is defined as a time relation between reception of data in a certain HARQ process and transmission of a HARQ Acknowledgement (ACK). Based on this timing, the receiver is able to determine to which HARQ process a received ACK is associated.

In TDD, an UL HARQ ACK is only allowed to be transmitted in an UL SF, and a DL HARQ ACK is only possible in a Physical HARQ Indicator Channel (PHICH) of a DL SF and a DwPTS of a special SF. The HARQ ACK of a transport block in SF "n" is transmitted in SF n+k, where $k \geq 4$. The value of k depends on the DL/UL configuration and is given in Table 2 and Table 3 for DL and UL transmissions, respectively, as defined in 3GPP TS 36.213, version 13.0.1.

TABLE 2

HARQ timing k for DL transmissions

| TDD DL/UL configuration | SF index n 0 | 1 | 2 | 3 | 4 | 5 | 6 | 7 | 8 | 9 |
|---|---|---|---|---|---|---|---|---|---|---|
| 0 | 4 | 6 | — | — | — | 4 | 6 | — | — | — |
| 1 | 7 | 6 | — | — | 4 | 7 | 6 | — | — | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 13 |
| 6 | 7 | 7 | — | — | — | 7 | 7 | — | — | 5 |

TABLE 3

HARQ timing k for UL transmissions

| TDD DL/UL configuration | SF index n 0 | 1 | 2 | 3 | 4 | 5 | 6 | 7 | 8 | 9 |
|---|---|---|---|---|---|---|---|---|---|---|
| 0 | — | — | 4 | 7 | 6 | — | — | 4 | 7 | 6 |
| 1 | — | — | 4 | 6 | — | — | — | 4 | 6 | — |
| 2 | — | — | 6 | — | — | — | — | 6 | — | — |
| 3 | — | — | 6 | 6 | 6 | — | — | — | — | — |
| 4 | — | — | 6 | 6 | — | — | — | — | — | — |
| 5 | — | — | 6 | — | — | — | — | — | — | — |
| 6 | — | — | 4 | 6 | 6 | — | — | 4 | 7 | — |

UL Scheduling Timing and PHICH Timing for TDD

The PHICH timing refers to the time relation between reception of a Negative Acknowledgement (NACK) on PHICH in SF "n" and the retransmission of the previous transport block in SF n+l. UL scheduling timing refers to the time relation between a received UL grant in SF n and the uplink transmission in SF n+l. In TDD, the PHICH timing and the UL scheduling timing are substantially the same. This is motivated by the possibility to override the PHICH by a dynamic UL scheduling grant sent on Physical Uplink Control Channel (PUCCH) to support adaptive retransmissions.

The value of "l" depends on the DL/UL configuration. For DL/UL configurations 1-6, the values of "l" are given in Table 4, copied from Table 8-2 in 3GPP TS 36.213 version 13.0.1. For DL/UL configuration 0, the value of "l" is 7, except if the PHICH is received in SF 0 or SF 5 and it is corresponding to the UL transmissions in SF 3 or SF 8 then the value of "l" is given in Table 4. The PHICH timing for DL/UL configuration 0 is illustrated in Table 5.

TABLE 4

PHICH timing l for UL retransmissions

| TDD DL/UL configura- | SF index n | | | | | | | | | |
|---|---|---|---|---|---|---|---|---|---|---|
| tion | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

TABLE 5

PHICH timing l for TDD DL/UL configuration 0

| | UL transmission SF index | | | | | |
|---|---|---|---|---|---|---|
| | 2 | 3 | 4 | 7 | 8 | 9 |
| HARQ feedback (PHICH) SF index | 6 | 0 | 0 | 1 | 5 | 5 |
| PHICH timing l | 7 | 4 | 7 | 7 | 4 | 7 |
| UL retransmission SF index | 3 | 4 | 7 | 8 | 9 | 2 |

Latency Reduction with Short SFs

Packet data latency is one performance metric that vendors, operators, and also end-users (via speed test applications) regularly measure. Latency measurements are done in all phases of a radio access network system lifetime, when verifying a new software release or system component, when deploying a system and when the system is in commercial operation.

Shorter latency than previous generations of 3GPP Radio Access Technologies (RATs) was one performance metric that guided the design of Long Term Evolution (LTE). LTE is also now recognized by the end-users to be a system that provides faster access to the Internet and lower data latencies than previous generations of mobile radio technologies.

Packet data latency is important not only for the perceived responsiveness of the system; it is also a parameter that indirectly influences the throughput of the system. Hypertext Transfer Protocol (HTTP)/Transmission Control Protocol (TCP) is the dominating application and transport layer protocol suite used on the Internet today. The typical size of HTTP based transactions over the Internet is in the range of a few tens of kilobytes (kB) up to 1 Megabyte (MB). In this size range, the TCP slow start period is a significant part of the total transport period of the packet stream. During TCP slow start, the performance is latency limited. Hence, improved latency can rather easily be showed to improve the average throughput for this type of TCP based data transactions.

Radio resource efficiency could be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

One area to address for packet latency reductions is the reduction of transport time of data and control signaling, by addressing the length of a Transmit Time Interval (TTI). In LTE Release 8, a TTI corresponds to one SF of length 1 ms. One such 1 ms TTI is constructed by using 14 Orthogonal Frequency Division Multiplexing (OFDM) or Single Carrier Frequency Division Multiple Access (SC-FDMA) symbols in the case of normal cyclic prefix and 12 OFDM or SC-FDMA symbols in the case of extended cyclic prefix. In LTE Release 13, a goal is to specify transmissions with shorter TTIs that are much shorter than the LTE Release 8 TTI.

The short TTI (sTTI) can be determined to have any duration in time and comprises resources on a number of OFDM or SC-FDMA symbols within a 1 ms SF. As one example, the duration of the sTTI may be 0.5 ms, i.e. seven OFDM or SC-FDMA symbols for the case with normal cyclic prefix. Another example is a TTI of only two OFDM or SC-FDMA symbols.

SUMMARY

Systems and methods are disclosed that relate to selecting Time Division Duplexing (TDD) subframes (SFs) where both downlink (DL) and uplink (UL) short Transmit Time Intervals (sTTIs) can be introduced without substantially affecting legacy TDD operations. In this regard, in some embodiments, a method of operation of a network node of a cellular communications network comprises partitioning a plurality of SFs into at least two sets of SFs. The at least two sets of SFs comprise a first set of SFs for legacy TDD transmissions and a second set of SFs for sTTI TDD transmissions. The method further comprises performing one or more telecommunications functions according to the at least two sets of SFs. In this manner, TDD sTTI transmissions can be performed without substantially affecting legacy TDD operations.

In some embodiments, the one or more telecommunications functions comprise scheduling. In some embodiments, the plurality of SFs is a plurality of SFs in a radio frame.

In some embodiments, partitioning the plurality of SFs into the at least two sets of SFs comprises selecting at least one DL SF index, selecting all mandatory UL SF indices that are predefined as being mandatory UL SF indices corresponding to the at least one DL SF index, selecting zero, one, or two or more optional UL SF indices that are predefined as being optional UL SF indices corresponding to the at least one DL SF index, forming the first set of SFs for legacy TDD transmissions using the at least one DL SF index, the mandatory UL SF indices, and the zero, one, or two or more optional UL SF indices, and forming the second set of SFs for sTTI TDD transmissions using a complement of the first set of SFs within a radio frame. Further, in some embodiments, the at least two sets of SFs are the same for all radio frames within a defined time period.

In some embodiments, partitioning the plurality of SFs into the at least two sets of SFs comprises selecting at least one UL SF index, selecting zero, one, or two or more DL SF indices that are predefined as optional DL SF indices corresponding to the at least one UL SF index, forming the first set of SFs for legacy TDD transmissions using the at least one UL SF index and the zero, one, or two or more DL SF indices, and forming the second set of SFs for sTTI TDD transmissions using a complement of the first set of SFs within a radio frame. Further, in some embodiments, the at least two sets of SFs vary from one radio frame to another in accordance with a predefined pattern.

In some embodiments, the at least two sets of SFs are the same for all radio frames within a defined time period. In some other embodiments, the at least two sets of SFs vary from one radio frame to another in accordance with a predefined pattern.

In some embodiments, the first set of SFs comprise an UL SF index for legacy UL transmission whose corresponding retransmission SF index is the same as the UL SF index.

In some embodiments, the second set of SFs comprises at least one DL SF for legacy DL transmission and/or at least one special SF for legacy TDD operation.

In some embodiments, partitioning the plurality of SFs into the at least two sets of SFs comprises partitioning the plurality of SFs into the at least two sets of SFs based on at least one criteria selected from a ratio of legacy wireless devices and sTTI wireless devices and a ratio of DL and UL traffic of legacy wireless devices.

Embodiments of a network node for a cellular communications network are also disclosed. In some embodiments, a network node for a cellular communications network is adapted to perform the method of operation of a network node according to any one of the embodiments disclosed herein.

In some embodiments, a network node for a cellular communications network comprises a processor and memory comprising instructions executable by the processor whereby the network node is operable to partition a plurality of SFs into at least two sets of SFs and perform one or more telecommunications functions according to the at least two sets of SFs. The at least two sets of SFs comprise a first set of SFs for legacy TDD transmissions and a second set of SFs for sTTI TDD transmissions.

In some embodiments, a network node for a cellular communications network comprises a partitioning module and a performing module. The partitioning module is operable to partition a plurality of SFs into at least two sets of SFs, the at least two sets of SFs comprising a first set of SFs for legacy TDD transmissions and a second set of SFs for sTTI TDD transmissions. The performing module is operable to perform one or more telecommunications functions according to the at least two sets of SFs.

Embodiments of a computer program are also disclosed. In some embodiments, a computer program comprises instructions which, when executed on at least one processor, cause the at least one processor to carry out the method of operation of a network node according to any one of the embodiments disclosed herein. In some embodiments, a carrier containing the aforementioned computer program is provided, wherein the carrier is one of an electronic signal, an optical signal, a radio signal, or a computer readable storage medium.

BRIEF DESCRIPTION OF THE DRAWINGS

The accompanying drawing figures incorporated in and forming a part of this specification illustrate several aspects of the disclosure, and together with the description serve to explain the principles of the disclosure. The drawings illustrate selected embodiments of the disclosed subject matter. In the drawings, like reference labels denote like features.

DETAILED DESCRIPTION

Figure 1:
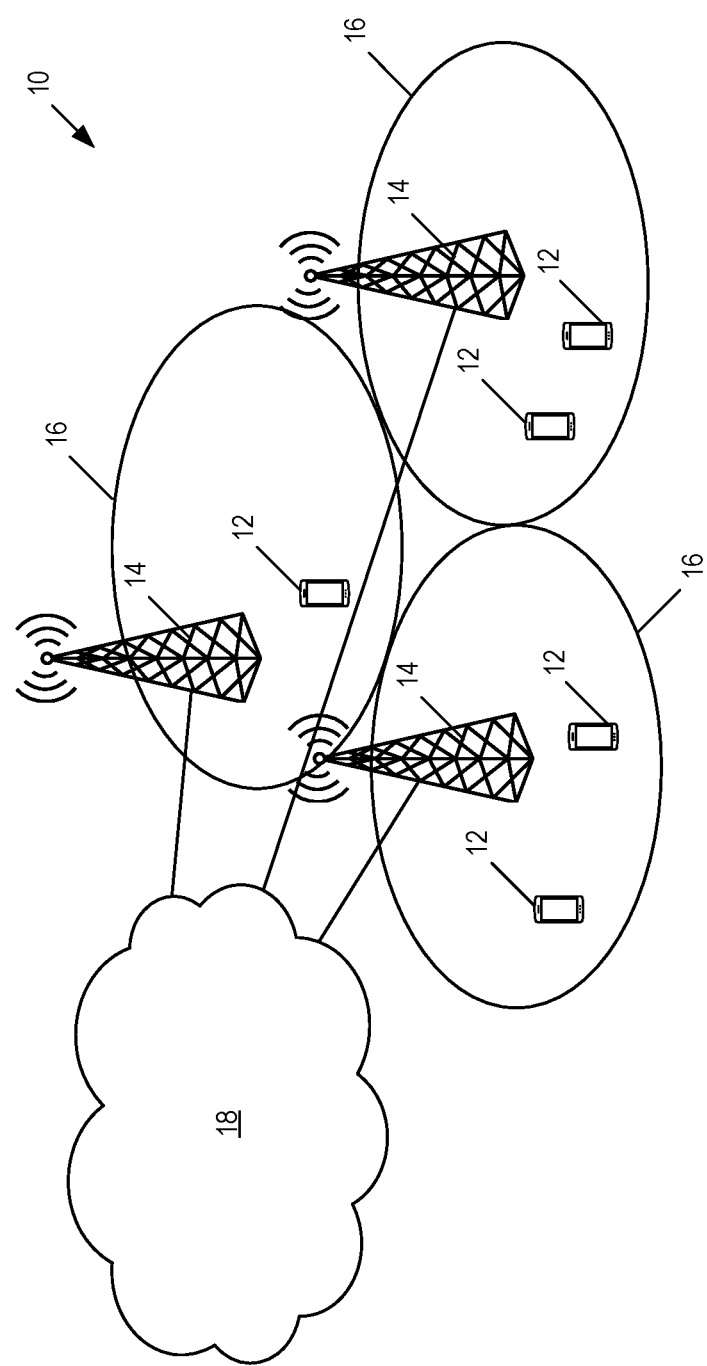
FIG. 1 illustrates an example of a communications network in which embodiments of the present disclosure may be implemented.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Those skilled in the art will appreciate the scope of the present disclosure and realize additional aspects thereof after reading the following detailed description of the embodiments in association with the accompanying drawing figures.

Before discussing embodiments of the present disclosure, the following definitions are beneficial. These definitions will be apparent to one of skill in the art upon reading the description below; however, they are provided here to assist the reader.

Mandatory Uplink (UL) Subframe (SF): As used herein, a mandatory UL SF or mandatory UL SF index is a SF/SF index that must be an UL SF/SF index for legacy UL transmission provided a given downlink (DL) SF/SF index for legacy DL transmission in order to comply with a predefined DL Hybrid Automatic Repeat Request (HARQ) feedback timing for legacy DL transmissions.

Optional UL SF: As used herein, an optional UL SF or optional UL SF index is a SF/SF index that may be an UL SF/SF index for legacy UL transmission provided a given DL SF/SF index for legacy DL transmission.

Optional DL SF: As used herein, an optional DL SF or optional DL SF index is a SF/SF index that may be a DL SF/SF index for legacy DL transmission provided a given UL SF/SF index for legacy UL transmission.

Legacy Wireless Device: As used herein, a legacy wireless device or legacy User Equipment device (UE) is a wireless device (e.g., a UE) that does not support short Transmit Time Interval (sTTI) transmissions.

sTTI Wireless Device: As used herein, a sTTI wireless device or sTTI UE is a wireless device (e.g., UE) that supports sTTI transmissions.

Certain embodiments are presented in recognition of shortcomings of conventional techniques and technologies, such as the following.

Based on the existing Frame Structure 2 (FS 2), as given in Third Generation Partnership Project (3GPP) Technical Specification (TS) 36.211, version 13.0.1, UL data and control information is only allowed to be transmitted in an UL SF, and DL transmission is only possible in a DL SF and in a DL Part (Downlink Pilot Time Slot (DwPTS)) of a special SF. Therefore, the delay for a granted UL data transmission will depend on when the next UL SF occurs, and the delay for a granted DL data transmission will depend on when the next DL SF or DwPTS occurs. The latency will thus depend on frame alignment in Time Division Duplexing (TDD). The HARQ timing for DL and UL transmissions, as shown in Table 2 and Table 3 above, also depends on the DL/UL configurations, which in turn has an impact on HARQ Round-Trip-Time (RTT).

Based on the existing FS 2, the latency due to frame alignment and HARQ RTT for TDD is much longer than that for FDD. Even with shortened Transmit Time Intervals (TTIs), the latency in TDD cannot be scaled linearly proportional to the TTI length, and it is limited to an additional waiting time due to the DL/UL configurations. To further reduce the latency for TDD, the existing FS 2 needs to be enhanced.

Certain proposed solutions introduce DL and UL sTTI transmissions on TDD special SFs, where the switch from DL to UL occurs for legacy UEs. Certain other proposed solutions introduce sTTI transmissions on TDD DL and UL SFs. In particular, part of a TDD DL SF can be used for UL sTTI transmissions, and part of a TDD UL SF can be used for DL sTTI transmissions.

By allowing DL/UL sTTI transmissions in each TDD SF, latency in frame alignment and HARQ RTT for TDD can be further reduced. However, to introduce an UL sTTI on a DL SF or on the DwPTS of a special SF, legacy UEs cannot be scheduled for DL transmissions on this DL SF or on this special SF. This is not possible if the enhanced or evolved Node B (eNB) is restricted to not transmit and receive simultaneously within the system bandwidth. Similarly, to introduce a DL sTTI on an UL SF, UL data and control information of legacy UEs cannot be transmitted on this UL SF. Because some SFs cannot be used by legacy UEs, the HARQ timing of legacy UEs can be affected for UL and/or DL transmissions.

The HARQ timing of legacy UEs introduces a coupling between DL and UL SFs. When a legacy DL transmission is scheduled, the UL subframe used for HARQ feedback for this DL transmission cannot be used for DL sTTI transmissions. The Physical HARQ Indicator Channel (PHICH) timing mentioned above introduces a coupling between different UL SFs. When a legacy UL transmission is scheduled, the UL subframe used for retransmission, which depends on the PHICH timing, cannot be used for DL sTTI transmissions.

The SF selection can be implemented in the eNB scheduler. The eNB partitions the SFs into two sets: the sTTI-only-SF set, where each SF in the set can be used for both UL and DL sTTI transmissions, and the legacy SF set, where legacy transmissions/retransmission and legacy HARQ timing are supported.

This partition is such that the HARQ feedback for a legacy TDD DL transmission always occurs in a UL SF that is in the legacy SF set and the retransmission for a legacy TDD UL transmission always occurs in a UL SF that is in the legacy SF set. Therefore, the eNB can freely schedule sTTI transmissions without worrying about whether this causes collisions with HARQ feedback from legacy UEs. This greatly reduces the scheduling flexibility.

The described embodiments may be implemented in any appropriate type of communication system supporting any suitable communication standards and using any suitable components. As one example, certain embodiments may be implemented in a communication network 10 such as that illustrated in FIG. 1. The communication network 10 is a cellular communications network (e.g., a Long Term Evolution (LTE) network) and, as such, sometimes referred to herein as a cellular communications network 10.

The communication network 10 comprises a plurality of wireless communication devices 12 (e.g., conventional UEs, Machine Type Communication (MTC)/Machine-to-Machine (M2M) UEs) and a plurality of radio access nodes 14 (e.g., eNBs or other base stations). The wireless communication devices 12 are also referred to herein as wireless devices 12 or UEs 12. At least some of the wireless communication devices 12 support sTTI UL and/or sTTI DL transmissions, where these wireless communication devices 12 are referred to herein as sTTI wireless communication devices or sTTI UEs. Further, at least some of the wireless communication devices 12 are legacy wireless communication devices that do not support sTTI transmissions. The communication network 10 is organized into cells 16, which are connected to a core network 18 via corresponding radio access nodes 14. The radio access nodes 14 are capable of communicating with the wireless communication devices 12 along with any additional elements suitable to support communication between the wireless communication devices 12 or between a wireless communication device 12 and another communication device (such as a landline telephone).

The following description presents examples of how to form the legacy SF set and the sTTI-only-SF set.

SF Selection with TDD DL/UL Configuration 1

Considering TDD DUUL configuration 1, Table 6 and Table 7 give the SF index of HARQ Acknowledgement (ACK) for DL and UL transmissions, respectively.

TABLE 6

SF index of HARQ ACK for DL transmissions, considering TDD DL/UL configuration 1

| | DL transmission SF index | | | | | |
| --- | --- | --- | --- | --- | --- | --- |
| | 0 | 1 | 4 | 5 | 6 | 9 |
| HARQ feedback SF index | 7 | 7 | 8 | 2 | 2 | 3 |

TABLE 7

SF index of HARQ ACK for UL transmissions, considering TDD DL/UL configuration 1

| | UL transmission SF index | | | |
| --- | --- | --- | --- | --- |
| | 2 | 3 | 7 | 8 |
| HARQ feedback SF index | 6 | 9 | 1 | 4 |
| UL retransmission SF index | 2 | 3 | 7 | 8 |

From Table 6 relations between UL HARQ feedback and DL transmissions can be derived. For legacy TDD UEs, if there is a legacy UE scheduled for DL transmissions on SF 0, then SF 7 has to be used for transmitting the corresponding HARQ ACKs. Therefore, in Table 8, SF 7 is labeled as a mandatory SF if SF 0 is selected for legacy TDD operation. In other words, if SF 0 is selected to be in the legacy SF set, then SF 7 should also be in the legacy SF set.

From Table 7, relations between an UL transmission and its corresponding retransmissions can be derived. If there is a legacy UE scheduled for UL transmissions on SF 7, then, based on Table 7, its corresponding retransmission UL SF is also SF 7. This implies that if SF 7 is selected as a legacy SF, then its retransmission will not be affected.

If DL SF 0 and UL SF 7 are selected for legacy TDD operation, then UL SF 2 can also be selected for legacy TDD because the UL retransmission SF for the UL transmissions on SF 2 is itself, as shown in Table 7. In this case, SF 2 is labeled as an optional SF, as shown in Table 8. Similarly, UL SFs 3 and 8 can also be optional SFs because the UL retransmission SFs for the UL transmissions on these UL SFs are themselves.

Note that even if the HARQ transmission in a legacy DL or if a special SF is required due to an earlier UL transmission as described in Table 7, this legacy DL or special SF can still be used for both short UL and DL TTIs, as the ACK/Negative Acknowledgement (NACK) for the UL transmission is sent on the PHICH channel, which is located in the control region, i.e. only the beginning of the SF is required to be DL. Using this relaxation, all legacy DL and special SFs can be used also for sTTI UL transmission when not needed for 1 millisecond (ms) TTI DL transmission.

Similarly,

UL SF 7 should be selected as a legacy SF, if DL SF 0 or special SF 1 is selected for legacy TDD operation. In this case, UL SFs 2, 3, and 8 are optional UL SFs and can also be selected for legacy TDD operation;

UL SF 8 should be selected as a legacy SF, if DL SF 4 is selected for legacy TDD operation. In this case, UL SFs 2, 3, and 7 are optional UL SFs and can also be selected for legacy TDD operation;

UL SF 2 should be selected as a legacy SF, if DL SF 5 or special SF 6 is selected for legacy TDD operation. In this case, UL SFs 3, 7, and 8 are optional UL SFs and can also be selected for legacy TDD operation;

UL SF 3 should be selected as a legacy SF, if DL SF 9 is selected for legacy TDD operation. In this case, UL SFs 2, 7, and 8 are optional UL SFs and can also be selected for legacy TDD operation.

Table 8 illustrates possible SF selection for legacy TDD UEs, considering TDD DL/UL configuration 1.

TABLE 8

SF selection table for legacy TDD UEs, considering TDD DL/UL configuration 1

| | DL transmission SF index | | | | | |
|---|---|---|---|---|---|---|
| | 0 | 1 | 4 | 5 | 6 | 9 |
| Mandatory UL SF index | 7 | 7 | 8 | 2 | 2 | 3 |
| Optional UL SF index | 2, 3, 8 | 2, 3, 8 | 2, 3, 7 | 3, 7, 8 | 3, 7, 8 | 2, 7, 8 |

Similarly, based on Table 8, a base set of selected SFs can be formed for configuration 1, that is, $\{\{0,7\}, \{0,2,7\}, \{0,3,7\}, \{0,7,8\}, \{0,2,3,7\}, \{0,2,7,8\}, \{0,3,7,8\}, \{0,2,3,7,8\}, \{1,7\}, \{1,2,7\}, \ldots\}$, where each element of the base set gives a SF selection for legacy TDD operation (e.g., $A=\{0, 7\}$), and it is formed by selecting one DL SF index and its corresponding mandatory UL SF index, and zero, one or a few optional UL SF indices. The union of any elements within the base set also gives a SF selection for legacy TDD operation (e.g., $A=\{0,7\}\cup\{1,2,7\}=\{0,1,2,7\}$).

The complement set of A, i.e., the other SFs that are not selected for legacy TDD operations, is the sTTI-only-SF set in which the SFs can be freely used for sTTI transmissions; that is, UL sTTIs can be introduced on a DL SF or the DwPTS of a special SF, and DL sTTIs can be introduced on an UL SF without affecting HARQ timing for legacy TDD UEs.

In some embodiments, the eNB selects at least one DL SF index and its corresponding mandatory UL SF index/indices to form the legacy SF set for legacy operation and the complement of this set is the sTTI-only-SF set in which the SFs can support both UL and DL sTTI transmissions.

In some embodiments, the UL SFs whose retransmission SFs are themselves can be in the legacy SF set, without affecting legacy TDD operations.

In some embodiments, any of legacy DL and special SFs can be in the sTTI-only-SF set without affecting legacy TDD operations.

In some embodiments, the SF selection, i.e. the legacy SF set and the sTTI-only-SF set formation, is the same for all radio frames within a certain time period.

SF Selection with TDD DL/UL Configuration 2

Considering TDD DL/UL configuration 2, Table 9 and Table 10 show the SF index of HARQ ACK for DL and UL transmissions, respectively.

TABLE 9

SF index of HARQ ACK for DL transmissions, considering TDD DL/UL configuration 2

| | DL transmission SF index | | | | | | | |
|---|---|---|---|---|---|---|---|---|
| | 0 | 1 | 3 | 4 | 5 | 6 | 8 | 9 |
| HARQ feedback SF index | 7 | 7 | 7 | 2 | 2 | 2 | 2 | 7 |

TABLE 10

SF index of HARQ ACK for UL transmissions, considering TDD DL/UL configuration 2

| | UL transmission SF index | |
|---|---|---|
| | 2 | 7 |
| HARQ feedback SF index | 6 | 1 |
| UL retransmission SF index | 2 | 7 |

From Tables 9 and 10, one may observe the following. First, UL SF 7 should be selected as a legacy SF, if SF 0, 1, 3, or 9 is selected for legacy TDD operation. In this case, UL SF 2 is an optional UL SF and can also be selected for legacy TDD operation. Second, UL SF 2 should be selected as a legacy SF, if SF 4, 5, 6, or 8 is selected for legacy TDD operation. In this case, UL SF 7 is an optional UL SF and can also be selected for legacy TDD operation.

Table 11 illustrates possible SF selection for legacy TDD UEs, considering TDD DL/UL configuration 2.

TABLE 11

SF selection table for legacy TDD UEs, considering TDD DL/UL configuration 2

|  | DL transmission SF index | | | | | | | |
| --- | --- | --- | --- | --- | --- | --- | --- | --- |
|  | 0 | 1 | 3 | 4 | 5 | 6 | 8 | 9 |
| Mandatory UL SF index | 7 | 7 | 7 | 2 | 2 | 2 | 2 | 7 |
| Optional UL SF index | 2 | 2 | 2 | 7 | 7 | 7 | 7 | 2 |

Similarly, based on Table 11, a base set of selected SFs can be formed for configuration 2. That is, {{0,7}, {0,2,7}, {1,7}, {1,2,7}, {3,7}, {2,3,7}, {4,2}, {2,4,7}, ... }, where each element of the base set gives a SF selection for legacy TDD operation (e.g., A={0,7}), and it is formed by selecting one DL SF index and its corresponding mandatory UL SF index, and zero or one optional UL SF index. The union of any elements within the base set also gives a SF selection for legacy TDD operation (e.g., A={0,7}∪{1,2,7}={0,1,2,7}).

The complement set of A, i.e., the other SFs that are not selected for legacy TDD operations, is the sTTI-only-SF set in which the SFs can be freely used for sTTI transmissions; that is, UL sTTIs can be introduced on a DL SF or the DwPTS of a special SF, and DL sTTIs can be introduced on an UL SF without affecting HARQ timing for legacy TDD UEs.

The SF selection, i.e. the legacy SF set and the sTTI-only-SF set formation, is fixed for all radio frames within a certain time period.

SF Selection with TDD DL/UL Configuration 3

Considering TDD DL/UL configuration 3, Table 12 and Table 13 give the SF index of HARQ ACK for DL and UL transmissions, respectively.

TABLE 12

SF index of HARQ ACK for DL transmissions, considering TDD DL/UL configuration 3

|  | DL transmission SF index | | | | | | |
| --- | --- | --- | --- | --- | --- | --- | --- |
|  | 0 | 1 | 5 | 6 | 7 | 8 | 9 |
| HARQ feedback SF index | 4 | 2 | 2 | 2 | 3 | 3 | 4 |

TABLE 13

SF index of HARQ ACK for UL transmissions, considering TDD DL/UL configuration 3

|  | UL transmission SF index | | |
| --- | --- | --- | --- |
|  | 2 | 3 | 4 |
| HARQ feedback SF index | 8 | 9 | 0 |
| UL retransmission SF index | 2 | 3 | 4 |

From Table 12 and Table 13, one may observe the following. First, UL SF 4 should be selected as a legacy SF, if SF 0 or 9 is selected for legacy TDD operation. In this case, UL SF 2 and SF 3 are optional UL SFs, which can also be selected for legacy TDD operation. Second, UL SF 2 should be selected as a legacy SF, if SF 1, 5, or 6 is selected for legacy TDD operation. In this case, UL SF 3 and SF 4 are optional UL SFs, which can also be selected as legacy SFs. Third, UL SF 3 should be selected as a legacy SF, if SF 7 or 8 is selected for legacy TDD operation. In this case, UL SF 2 and SF 4 are optional UL SFs, which can also be selected as a legacy SF.

Table 14 illustrates possible SF selection for legacy TDD UEs, considering TDD DL/UL configuration 3.

TABLE 14

SF selection table for legacy TDD UEs, considering TDD DL/UL configuration 3

|  | DL transmission SF index | | | | | | |
| --- | --- | --- | --- | --- | --- | --- | --- |
|  | 0 | 1 | 5 | 6 | 7 | 8 | 9 |
| Mandatory UL SF index | 4 | 2 | 2 | 2 | 3 | 3 | 4 |
| Optional UL SF index | 2, 3 | 3, 4 | 3, 4 | 3, 4 | 2, 4 | 2, 4 | 2, 3 |

Similarly, based on Table 14, a base set of selected SFs can be formed for configuration 3. That is, {{0,4}, {0,2,4}, {0,3,4}, {0,2,3,4}, {1,2}, {1,2,3}, {1,2,4}, {1,2,3,4}, ... }, where each element of the base set gives a SF selection for legacy TDD operation (e.g., A={0,4}) and it is formed by selecting one DL SF index and its corresponding mandatory UL SF index, and zero or one optional UL SF index. The union of any elements within the base set also gives a SF selection for legacy TDD operation (e.g., A={0,4}∪{1, 2}={0,1,2,4}).

The complement set of A, i.e., the other SFs that are not selected for legacy TDD operations, is the sTTI-only-SF set in which the SFs can be freely used for sTTI transmissions. That is, UL sTTIs can be introduced on a DL SF or the DwPTS of a special SF, and DL sTTIs can be introduced on an UL SF without affecting HARQ timing for legacy TDD UEs.

The SF selection, i.e. the legacy SF set and the sTTI-only-SF set formation, is fixed for all radio frames within a certain time period.

SF Selection with TDD DUUL Configuration 4

Considering TDD DL/UL configuration 4, Table 15 and Table 16 give the SF index of HARQ ACK for DL and UL transmissions, respectively.

TABLE 15

SF index of HARQ ACK for DL transmissions, considering TDD DL/UL configuration 4

|  | DL transmission SF index | | | | | | | |
| --- | --- | --- | --- | --- | --- | --- | --- | --- |
|  | 0 | 1 | 4 | 5 | 6 | 7 | 8 | 9 |
| HARQ feedback SF index | 2 | 2 | 2 | 2 | 3 | 3 | 3 | 3 |

TABLE 16

SF index of HARQ ACK for UL transmissions,
considering TDD DL/UL configuration 4

|  | UL transmission SF index | |
|---|---|---|
|  | 2 | 3 |
| HARQ feedback SF index | 8 | 9 |
| UL retransmission SF index | 2 | 3 |

From Table 15 and Table 16, one may observe the following. First, UL SF 2 should be selected as a legacy SF, if SF 0, 1, 4, or 5 is selected for legacy TDD operation. In this case, UL SF 3 is an optional UL SF, which can also be selected for legacy TDD operation. Second, UL SF 3 should be selected as a legacy SF, if SF 6, 7, 8, or 9 is selected for legacy TDD operation. In this case, UL SF 2 is an optional UL SF, which can also be selected for legacy TDD operation.

Table 17 illustrates possible SF selection for legacy TDD UEs, considering TDD DL/UL configuration 4.

TABLE 17

SF selection table for legacy TDD UEs,
considering TDD DL/UL configuration 4

|  | DL transmission SF index | | | | | | | |
|---|---|---|---|---|---|---|---|---|
|  | 0 | 1 | 4 | 5 | 6 | 7 | 8 | 9 |
| Mandatory UL SF index | 2 | 2 | 2 | 2 | 3 | 3 | 3 | 3 |
| Optional UL SF index | 3 | 3 | 3 | 3 | 2 | 2 | 2 | 2 |

Similarly, based on Table 17, a base set of selected SFs can be formed for configuration 4. That is, {{0,2}, {0,2,3}, {1,2}, {1,2,3}, {2,4}, {2,3,4}, {2,5}, {2,3,5} ... }, where each element of the base set gives a SF selection for legacy TDD operation (e.g., A={0,2,3}) and it is formed by selecting one DL SF index and its corresponding mandatory UL SF index, and zero or one optional UL SF index. The union of any elements within the base set also gives a SF selection for legacy TDD operation (e.g., A={0,2,3}∪{1,2,3}={0,1,2,3}).

The complement set of A, i.e., the other SFs that are not selected for legacy TDD operations, is the sTTI-only-SF set in which the SFs can be freely used for sTTI transmissions; that is, UL sTTIs can be introduced on a DL SF or the DwPTS of a special SF, and DL sTTIs can be introduced on an UL SF without affecting HARQ timing for legacy TDD UEs.

The SF selection, i.e. the legacy SF set and the sTTI-only-SF set formation, is fixed for all radio frames within a certain time period.

SF Selection with TDD DL/UL Configuration 5

Considering TDD DL/UL configuration 5, Table 18 and Table 19 give the SF index of HARQ ACK for DL and UL transmissions, respectively.

TABLE 18

SF index of HARQ ACK for DL transmissions,
considering TDD DL/UL configuration 5

|  | DL transmission SF index | | | | | | | | |
|---|---|---|---|---|---|---|---|---|---|
|  | 0 | 1 | 3 | 4 | 5 | 6 | 7 | 8 | 9 |
| HARQ feedback SF index | 2 | 2 | 2 | 2 | 2 | 2 | 2 | 2 | 2 |

TABLE 19

SF index of HARQ ACK for UL transmissions,
considering TDD DL/UL configuration 5

| UL transmission SF index | 2 |
|---|---|
| HARQ feedback SF index | 8 |
| UL retransmission SF index | 2 |

From Table 18 and Table 19, one may observe that UL SF 2 should be selected as a legacy SF, if any DL or special SF is selected for legacy TDD operation.

Table 20 illustrates possible SF selection for legacy TDD UEs, considering TDD DL/UL configuration 5.

TABLE 20

SF selection table for legacy TDD UEs,
considering TDD DL/UL configuration 5

|  | DL transmission SF index | | | | | | | | |
|---|---|---|---|---|---|---|---|---|---|
|  | 0 | 1 | 3 | 4 | 5 | 6 | 7 | 8 | 9 |
| Mandatory UL SF index | 2 | 2 | 2 | 2 | 2 | 2 | 2 | 2 | 2 |

Similarly, based on Table 20, a base set of selected SFs can be formed for configuration 5. That is, {{0,2}, {1,2}, {2,3}, ... }, where each element of the base set gives a SF selection for legacy TDD operation (e.g., A={0,2}) and it is formed by selecting one DL SF index and its corresponding mandatory UL SF index. The union of any elements within the base set also gives a SF selection for legacy TDD operation (e.g., A={0,2}∪{1,2}={0,1,2}).

The complement set of A, i.e., the other SFs that are not selected for legacy TDD operations, is the sTTI-only-SF set in which the SFs can be freely used for sTTI transmissions; that is, UL sTTIs can be introduced on a DL SF or the DwPTS of a special SF, and DL sTTIs can be introduced on an UL SF without affecting HARQ timing for legacy TDD UEs.

The SF selection, i.e. the legacy SF set and the sTTI-only-SF set formation, is fixed for all radio frames within a certain time period.

SF Selection with TDD DL/UL Configuration 6

Considering TDD DL/UL configuration 6, Table 21 and Table 22 give the SF index of HARQ ACK for DL and UL transmissions, respectively.

TABLE 21

SF index of HARQ ACK for DL transmissions,
considering TDD DL/UL configuration 6

| | DL transmission SF index | | | | |
|---|---|---|---|---|---|
| | 0 | 1 | 5 | 6 | 9 |
| HARQ feedback SF index | 7 | 8 | 2 | 3 | 4 |

TABLE 22

SF index of HARQ ACK for UL transmissions,
considering TDD DL/UL configuration 6

| | UL transmission SF index | | | | |
|---|---|---|---|---|---|
| | 2 | 3 | 4 | 7 | 8 |
| HARQ feedback SF index | 6 | 9 | 0 | 1 | 5 |
| UL retransmission SF index | 3 | 4 | 7 | 8 | 2 |

Fixed SF Selection

From Table 22 one may observe that all UL SFs are coupled with each other for configuration 6, i.e., if any UL SF is selected for legacy TDD operation, other UL SFs should also be used for legacy TDD operation to support retransmissions. Therefore, with configuration 6, all UL SFs are mandatory SFs and belong to the legacy SF set, if we want to have a fixed SF selection for all radio frames.

Table 23 illustrates possible fixed SF selection for legacy TDD UEs, considering TDD DL/UL configuration 6.

TABLE 23

Fixed SF selection table for legacy TDD UEs,
considering TDD DL/UL configuration 6

| | DL transmission SF index | | | | |
|---|---|---|---|---|---|
| | 0 | 1 | 5 | 6 | 9 |
| Mandatory UL SF index | 2, 3, 4, 7, 8 | 2, 3, 4, 7, 8 | 2, 3, 4, 7, 8 | 2, 3, 4, 7, 8 | 2, 3, 4, 7, 8 |

Similarly to configurations 1-5, based on Table 23, a base set of selected SFs can be formed for configuration 6. That is, {{0,2,3,4,7,8}, {1,2,3,4,7,8}, {2,3,4,5,7,8}, {2,3,4,6,7,8}, {2,3,4,7,8,9}}, where each element of the base set gives a SF selection for legacy TDD operation (e.g., A={0,2,3,4,7,8}) and it is formed by selecting one DL SF index and its corresponding mandatory UL SF indices. The union of any elements within the base set also gives a SF selection for legacy TDD operation (e.g., A={0,2,3,4,7,8}∪{1,2,3,4,7,8}={0,1,2,3,4,7,8}).

The complement set of A, i.e., the other SFs that are not selected for legacy TDD operations, is the sTTI-only-SF set in which the SFs can be freely used for sTTI transmissions; that is, UL sTTIs can be introduced on a DL SF or the DwPTS of a special SF.

The SF selection, i.e. the legacy SF set and the sTTI-only-SF set formation, is fixed for all radio frames within a certain time period.

Patterned SF Selection

To allow the possibility for inserting DL sTTI transmissions in an UL SF with configuration 6, a patterned SF selection for legacy TDD can be used. That is, the SF selection varies between radio frames following a predefined pattern.

Table 24 lists a few possible patterned SF selection for legacy TDD UEs, considering TDD DL/UL configuration 6. Several other combinations of UL transmission SF index are possible. The patterned SF selection has a periodicity of 5 radio frames. That is, the same SF selection repeats every 5 radio frames.

The pattern is designed such that the UL retransmission SF, corresponding to an UL SF of radio frame n, is a legacy UL SF in radio frame n+1. For example, considering pattern 2 in Table 24, the retransmission SFs for UL SF 7 and SF 8 of radio frame n are SF 8 and SF 2 of radio frame n+1, respectively, which are selected for legacy transmissions in radio frame n+1. For this case, DL SF 0, SF 1, and SF 5 are optional, which can also be selected for legacy transmissions, because the corresponding HARQ ACKs of SF 0 and SF 1 of radio frame n are sent on SF 7 and SF 8 of radio frame n, and the corresponding HARQ ACKs of SF 5 of radio frame n are sent on SF 2 of radio frame n+1.

TABLE 24

Patterned SF selection table for legacy TDD
UEs, considering TDD DL/UL configuration 6

| | Radio frame index | n | n + 1 | n + 2 | n + 3 | n + 4 |
|---|---|---|---|---|---|---|
| Pattern 1 | UL transmission SF index | 7 | 8 | 2 | 3 | 4 |
| | Optional DL SF index | 0 | 1, 5 | 6 | 9 | |
| Pattern 2 | UL transmission SF index | 7, 8 | 8, 2 | 2, 3 | 3, 4 | 4, 7 |
| | Optional DL SF index | 0, 1, 5 | 1, 5, 6 | 6, 9 | 9 | 0 |
| Pattern 3 | UL transmission SF index | 7, 8, 2 | 8, 2, 3 | 2, 3, 4 | 3, 4, 7 | 4, 7, 8 |
| | Optional DL SF index | 0, 1, 5, 6 | 1, 5, 6, 9 | 6, 9 | 9, 0 | 0, 1, 5 |
| Pattern 4 | UL transmission SF index | 7, 8, 2, 3 | 8, 2, 3, 4 | 2, 3, 4, 7 | 3, 4, 7, 8 | 4, 7, 8, 2 |

TABLE 24-continued

Patterned SF selection table for legacy TDD
UEs, considering TDD DL/UL configuration 6

| | Radio frame index | n | n + 1 | n + 2 | n + 3 | n + 4 |
|---|---|---|---|---|---|---|
| Pattern 5 | Optional DL SF index | 0, 1, 5, 6, 9 | 1, 5, 6, 9 | 0, 6, 9 | 0, 1, 5, 9 | 0, 1, 5, 6 |
| | UL transmission SF index | 7, 2 | 8, 3 | 2, 4 | 3, 7 | 4, 8 |
| | Optional DL SF index | 0, 6 | 1, 5, 9 | 6 | 9, 0 | 1, 5 |

In some embodiments, the eNB selects at least one UL SF index together with zero, one, or some of the corresponding optional DL SF index/indices to form the legacy SF set for legacy operation and the complement of this set is the sTTI-only-SF set, in which the SFs can support both UL and DL sTTI transmissions.

In some embodiments, the SF selection, i.e. the legacy SF set and the sTTI-only-SF set formation, varies between radio frames with a predefined pattern.

SF Selection with TDD DL/UL Configuration 0

Considering TDD DL/UL configuration 0, Table 25 and Table 26 give the SF index of HARQ ACK for DL and UL transmissions and retransmissions, respectively.

TABLE 25

SF index of HARQ ACK for DL transmissions,
considering TDD DL/UL configuration 0

| | DL transmission SF index | | | |
|---|---|---|---|---|
| | 0 | 1 | 5 | 6 |
| HARQ feedback SF index | 4 | 7 | 9 | 2 |

TABLE 26

SF index of HARQ ACK for UL transmissions and retransmissions,
considering TDD DL/UL configuration 0

| | UL transmission SF index | | | | | |
|---|---|---|---|---|---|---|
| | 2 | 3 | 4 | 7 | 8 | 9 |
| HARQ feedback SF index | 6 | 0 | 0 | 1 | 5 | 5 |
| UL retransmission SF index | 3 | 4 | 7 | 8 | 9 | 2 |

Fixed SF Selection

From Table 25 and Table 26, we see that similar to configuration 6, many UL SFs are coupled with each other for configuration 0, i.e., if any UL SF is selected for legacy TDD operation, all UL SFs (i.e., SF numbers 2, 3, 4, 7, 8, and 9) should also be used for legacy TDD operation to support retransmissions. Therefore, with configuration 0, all UL SFs are mandatory SFs and belong to the legacy SF set, if we want to have a fixed SF selection for all radio frames.

Table 27 illustrates possible fixed SF selection for legacy TDD UEs, considering TDD DL/UL configuration 0.

TABLE 27

Fixed SF selection table for legacy TDD UEs,
considering TDD DL/UL configuration 0

| DL SF index | 0 | 1 | 5 | 6 |
|---|---|---|---|---|
| Mandatory UL SF index | 2, 3, 4, 7, 8, 9 | 2, 3, 4, 7, 8, 9 | 2, 3, 4, 7, 8, 9 | 2, 3, 4, 7, 8, 9 |

Let A denote the legacy SF set, which is selected for legacy TDD operation. Based on Table 27, a base set of selected SFs can be formed for configuration 0, that is, {{0,2,3,4,7,8,9}, {1,2,3,4,7,8,9}, {2,3,4,5,7,8,9}, {2,3,4,6,7,8,9}}, where each element of the base set gives a SF selection for legacy TDD operation (e.g., A={0,2,3,4,7,8,9}), and it is formed by selecting one DL SF index and its corresponding mandatory UL SF indices. The union of any elements within the base set also gives a SF selection for legacy TDD operation.

The complement set of A, i.e., the other SFs that are not selected for legacy TDD operations, is the sTTI-only-SF set in which the SFs can be freely used for sTTI transmissions; that is, UL sTTIs can be introduced on a DL SF or the DwPTS of a special SF.

The SF selection, i.e. the legacy SF set and the sTTI-only-SF set formation, is fixed for all radio frames within a certain time period.

Patterned SF Selection

To allow the possibility for inserting DL sTTI transmissions in an UL SF with configuration 0, similar to configuration 6, a patterned SF selection for legacy TDD can be used. That is, the SF selection varies between radio frames with a predefined pattern.

Table 28 lists examples of possible patterned SF selection for legacy TDD UEs, considering TDD DL/UL configuration 0. The patterned SF selection has a periodicity of 6 radio frames. That is, the same SF selection repeats every 6 radio frames.

The pattern is designed such that the UL retransmission SF, corresponding to an UL SF of radio frame n, is a legacy UL SF in radio frame n+1. For example, considering pattern 2 in Table 28, the retransmission SFs for UL SF 3 and SF 4 of radio frame n+1 are SF 4 and SF 7 of radio frame n+2, respectively, which are selected for legacy transmissions in radio frame n+2. For this case, DL SF 0 of radio frame n+1 is optional, which can also be selected for legacy transmissions, because its corresponding HARQ ACKs are sent on SF 4 of radio frame n+1, which is in the legacy SF set.

TABLE 28

Patterned SF selection table for legacy TDD UEs, considering TDD DL/UL configuration 0

| | Radio frame index | N | n + 1 | n + 2 | n + 3 | n + 4 | n + 6 |
|---|---|---|---|---|---|---|---|
| Pattern 1 | UL transmission SF index | 2 | 3 | 4 | 7 | 8 | 9 |
| | Optional DL SF index | | | 0 | 1 | | 5, 6 |
| Pattern 2 | UL transmission SF index | 2, 3 | 3, 4 | 4, 7 | 7, 8 | 8, 9 | 9, 2 |
| | Optional DL SF index | | 0 | 0, 1 | 1 | 5, 6 | 5, 6 |
| Pattern 3 | UL transmission SF index | 2, 3, 4 | 3, 4, 7 | 4, 7, 8 | 7, 8, 9 | 8, 9, 2 | 9, 2, 3 |
| | Optional DL SF index | 0 | 0, 1 | 0, 1 | 5, 6 | 5, 6 | 5, 6 |
| Pattern 4 | UL transmission SF index | 2, 3, 4, 7 | 3, 4, 7, 8 | 4, 7, 8, 9 | 7, 8, 9, 2 | 8, 9, 2, 3 | 9, 2, 3, 4 |
| | Optional DL SF index | 0, 1 | 0, 1 | 0, 1, 5, 6 | 1, 5, 6 | 5, 6 | 0, 5, 6 |
| Pattern 5 | UL transmission SF index | 2, 3, 4, 7, 8 | 3, 4, 7, 8, 9 | 4, 7, 8, 9, 2 | 7, 8, 9, 2, 3 | 8, 9, 2, 3, 4 | 9, 2, 3, 4, 7 |
| | Optional DL SF index | 0, 1 | 0, 1, 5, 6 | 0, 1, 5, 6 | 1, 5, 6 | 0, 5, 6 | 0, 1, 5, 6 |

In some embodiments, the eNB selects at least one UL SF index together with zero, one, or some of the corresponding optional DL SF index/indices to form the legacy SF set for legacy operation and the complement of this set is the sTTI-only-SF set, in which the SFs can support both UL and DL sTTI transmissions.

In some embodiments, the SF selection, i.e. the legacy SF set and the sTTI-only-SF set formation, varies between radio frames with a predefined pattern.

Traffic Adaptation

For each TDD DL/UL configuration, the SF selection can adapt to the ratio of the legacy UEs and the sTTI UEs. If there is more legacy UEs in the network, then, more SFs can be selected for legacy TDD operation. If there are more sTTI UEs in the network, then fewer SF will be selected for legacy TDD operation. The SF selection can also adapt to the ratio of DL and UL traffic of legacy UEs. If there is more DL traffic for legacy UEs, then more DL SFs can be selected for legacy TDD operation.

An example of a traffic adaptation table for TDD configuration 1 is shown in Table 29. The SFs in the example are allocated for legacy use to generate minimum impact on sTTI operation and to give good distribution of legacy SFs over the radio frame, to ensure good latency performance.

System Operation

Figure 2:
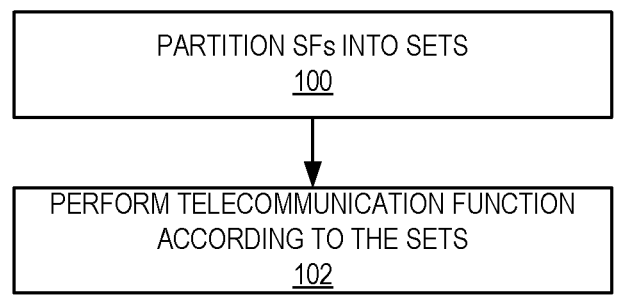
FIG. 2 is a flowchart illustrating a method according to an example embodiment of the present disclosure.

FIG. 2 is a flowchart illustrating a method according to an example embodiment. The method can be performed, for instance, by a radio access node 14 such as that illustrated in FIG. 1.

Referring to FIG. 2, the method comprises partitioning SFs into at least two sets: (1) a first set (e.g., a sTTI-only-SF set) where each SF in the set can be used both UL and DL sTTI transmissions, and (2) a second set (e.g., a legacy SF set), where legacy transmissions/retransmission and legacy HARQ timing are supported (step 100). Such partitioning may comprise, for instance, defining the sets, or dividing, organizing, or selecting available SFs in some fashion. The method further comprises performing one or more telecommunications functions according to the at least two sets (step 102). For instance, such functions may include communication (e.g., transmission and/or reception), scheduling, etc.

Figure 3:
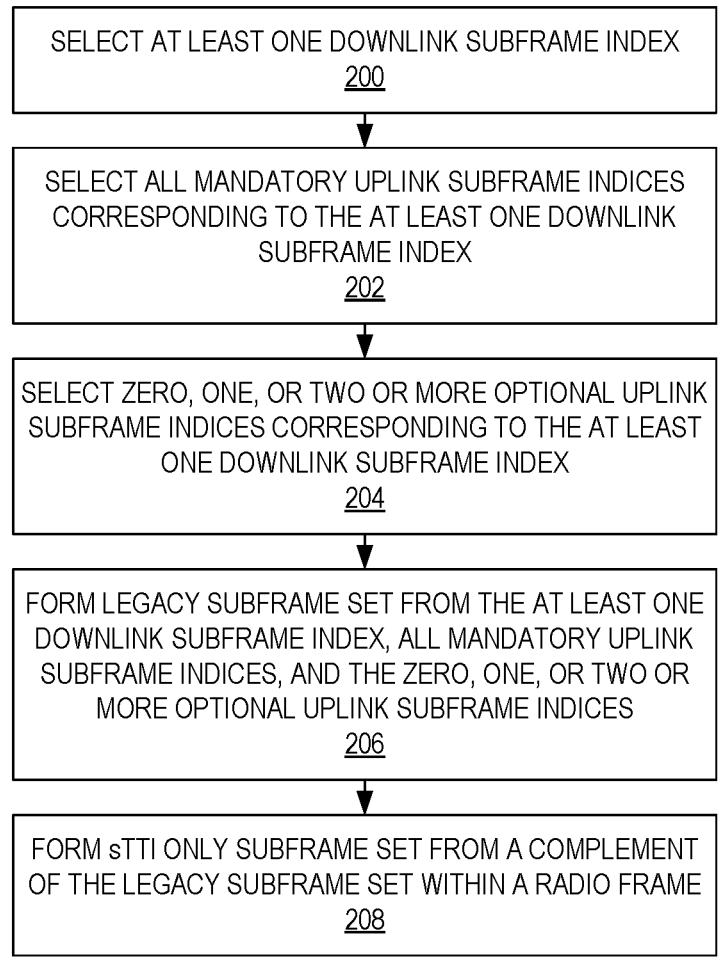
FIG. 3 is a flow chart illustrating a method according to another example embodiment of the present disclosure.

The method of FIG. 2 may use various alternative approaches for SF selection (i.e., for partitioning the SFs into the legacy-only SF set and the sTTI-only SF set). In one approach, referred to as Fixed SF selection, the legacy SF set and the sTTI-only-SF set formation can be the same for all radio frames within a certain time period. The fixed SF selection process is illustrated in FIG. 3. This process may be performed by a radio access node 14, which in this

TABLE 29

Traffic adaptation table for Configuration 1 with SF indices with a radio frame. For each column step from left a DL SF is added for legacy usage, and for each row step from top an UL SF is added. SF index in parenthesis denotes required SF for HARQ.

| | 0 DL SF | 1 DL SF | 2 DL SF | 3 DL SF | 4 DL SF | 5 DL SF | 6 DL SF |
|---|---|---|---|---|---|---|---|
| 0 UL SF | — | 0 (7) | — | — | — | — | — |
| 1 UL SF | 7 | 0, 7 | 1 | 5 (2) | — | — | — |
| 2 UL SF | 2 | 0, 2 | 1, 2 | 5, 2 | 6 | 4 (8) | — |
| 3 UL SF | 8 | 0, 8 | 1, 8 | 5, 8 | 6, 8 | 4, 8 | 9 (3) |
| 4 UL SF | 3 | 0, 3 | 1, 3 | 5, 3 | 6, 3 | 4, 3 | 9, 3 | following discussion is an eNB. In this and other approaches described herein, the order of certain operations may be modified. For instance, in fixed SF selection the order of steps 202 and 204 (discussed below) could be exchanged. In this approach, the legacy SF set and the sTTI-only-SF set may be defined/formed/determined/selected/etc. as follows.

Step 200: The eNB selects at least one DL SF index.
Step 202: Based on the selected DL SF index/indices, the eNB selects the corresponding mandatory UL SF index/indices (i.e., selects all predefined mandatory UL SF index/indices).
Step 204: Based on the selected DL SF index/indices, the eNB selects zero, one, or a few of the corresponding optional UL SF indices.
Step 206: The selected DL and UL SFs from step 200, step 202, and step 204 are used to form the legacy SF set. In other words, the eNB combines the at least one DL SF index from step 200, the mandatory UL SF index/indices from step 202, and the optional UL SF indices from step 204 (if any) to form the legacy SF set.
To form the sTTI-only-SF set,
Step 208: The complement set of the legacy SF set within a radio frame is the sTTI-only-SF set. In other words, the eNB uses the complement of the legacy SF set to form the sTTI-only SF set.

Figure 4:
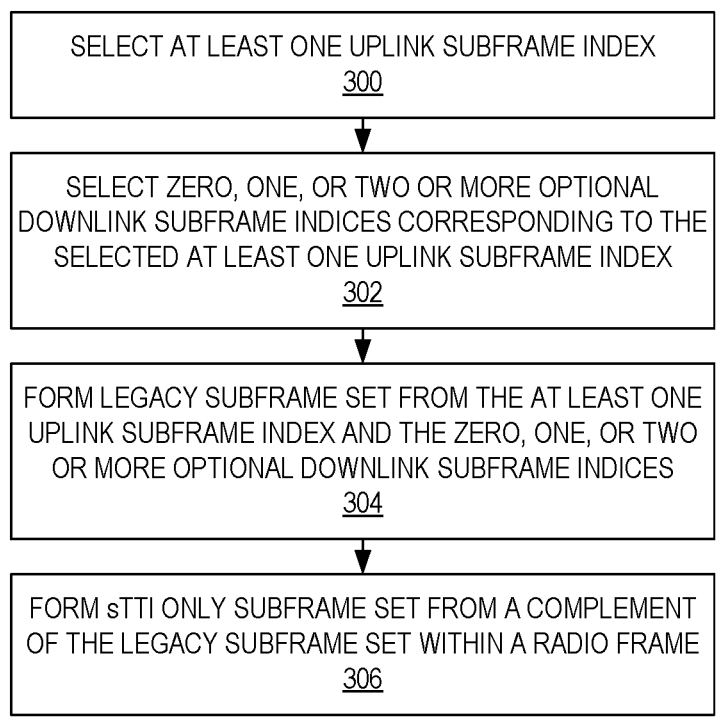
FIG. 4 is a flow chart illustrating a method according to another example embodiment of the present disclosure.

In another approach, referred to as Patterned SF selection, the legacy SF set and the sTTI-only-SF set formation varies between radio frames with a predefined pattern. As illustrated in FIG. 4, in this approach, the legacy SF set and the sTTI-only-SF set may be defined/formed/determined/selected/etc. as follows.

Step 300: The eNB selects at least one UL SF index.
Step 302: Based on the selected UL SF index/indices, the eNB selects zero, one, or a few of the corresponding optional DL SF indices.
Step 304: the selected DL and UL SFs from step 300 and step 302, are used to form the legacy SF set.
To form the sTTI-only-SF set,
Step 306: The complement set of the legacy SF set within a radio frame is the sTTI-only-SF set. In other words, the eNB uses the complement of the legacy SF set to form the sTTI-only SF set.

Note that FIG. 4 describes a process in which the eNB first selects at least one UL SF index and then, based on the selected UL SF index/indices, forms the legacy and sTTI-only SF sets. Similarly, FIG. 3 describes a process in which the eNB first selects at least one DL SF index and then, based on the selected DL SF index/indices, forms the legacy and sTTI-only SF sets. However, these two processes can be used in combination. For example, the eNB may first select a UL subframe and then later select a DL subframe. The selection of the UL subframe results in a first legacy SF set. The selection of the DL subframe results in a second legacy SF set. In this case, the sTTI-only SF set is the set of only those subframes that are not part of the first legacy SF set or second legacy SF set.

Example Embodiments of a Wireless Communication Device

Figure 5:
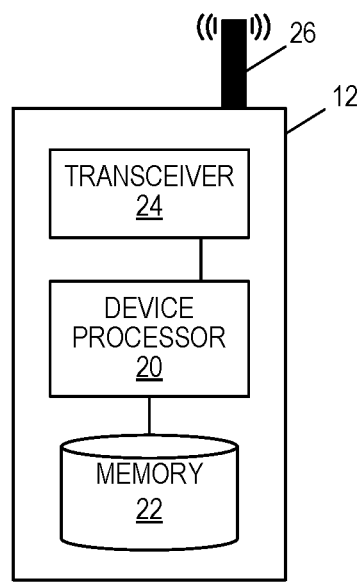
FIGS. 5 and 6 illustrate example embodiments of a wireless device.
Figure 6:
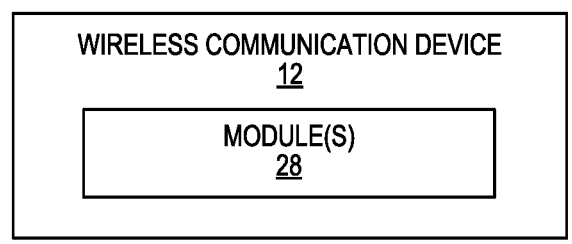

Although wireless communication devices 12 may represent communication devices that include any suitable combination of hardware and/or software, these wireless communication devices may, in certain embodiments, represent devices such as an example wireless communication device illustrated in greater detail by FIGS. 5 and 6.

Referring to FIG. 5, a wireless communication device 12 comprises a device processor 20, a memory 22, a transceiver 24, and an antenna 26. As will be appreciated by those of skill in the art, the device processor 20 includes, e.g., a Central Processing Unit(s) (CPU(s)), a Digital Signal Processor(s) (DSP(s)), an Application Specific Integrated Circuit(s) (ASIC(s)), a Field Programmable Gate Array(s) (FPGA(s)), and/or the like, or any combination thereof. In certain embodiments, some or all of the functionality described as being provided by UEs, MTC or M2M devices, and/or any other types of wireless communication devices may be provided by the device processor 20 executing instructions stored on a computer-readable medium, such as the memory 22 shown in FIG. 5. Alternative embodiments may include additional components beyond those shown in FIG. 5 that may be responsible for providing certain aspects of the device's functionality, including any of the functionality described herein.

FIG. 6 illustrates another example embodiment of a wireless communication device 12. As illustrated, the wireless communication device 12 includes one or more modules 28, each of which is implemented in software. The module(s) 28 provide the functionality of the wireless communication device 12 (e.g., the functionality of the UE, MTC or M2M device, or any other type of wireless communication device) as described herein.

Example Embodiments of a Radio Access Node

Figure 7:
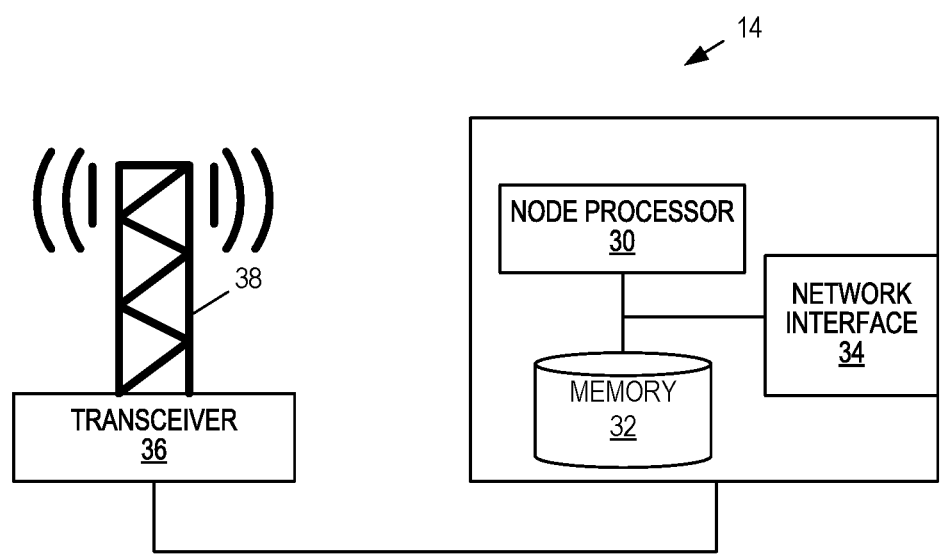
FIGS. 7 through 9 illustrate example embodiments of a radio access node.
Figure 9:
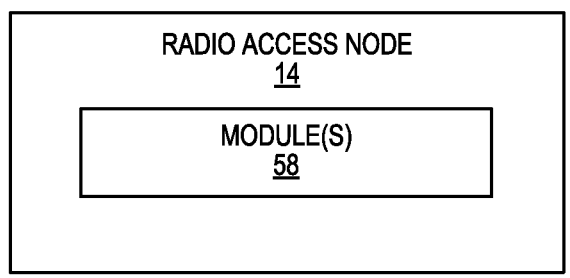
Figure 8:
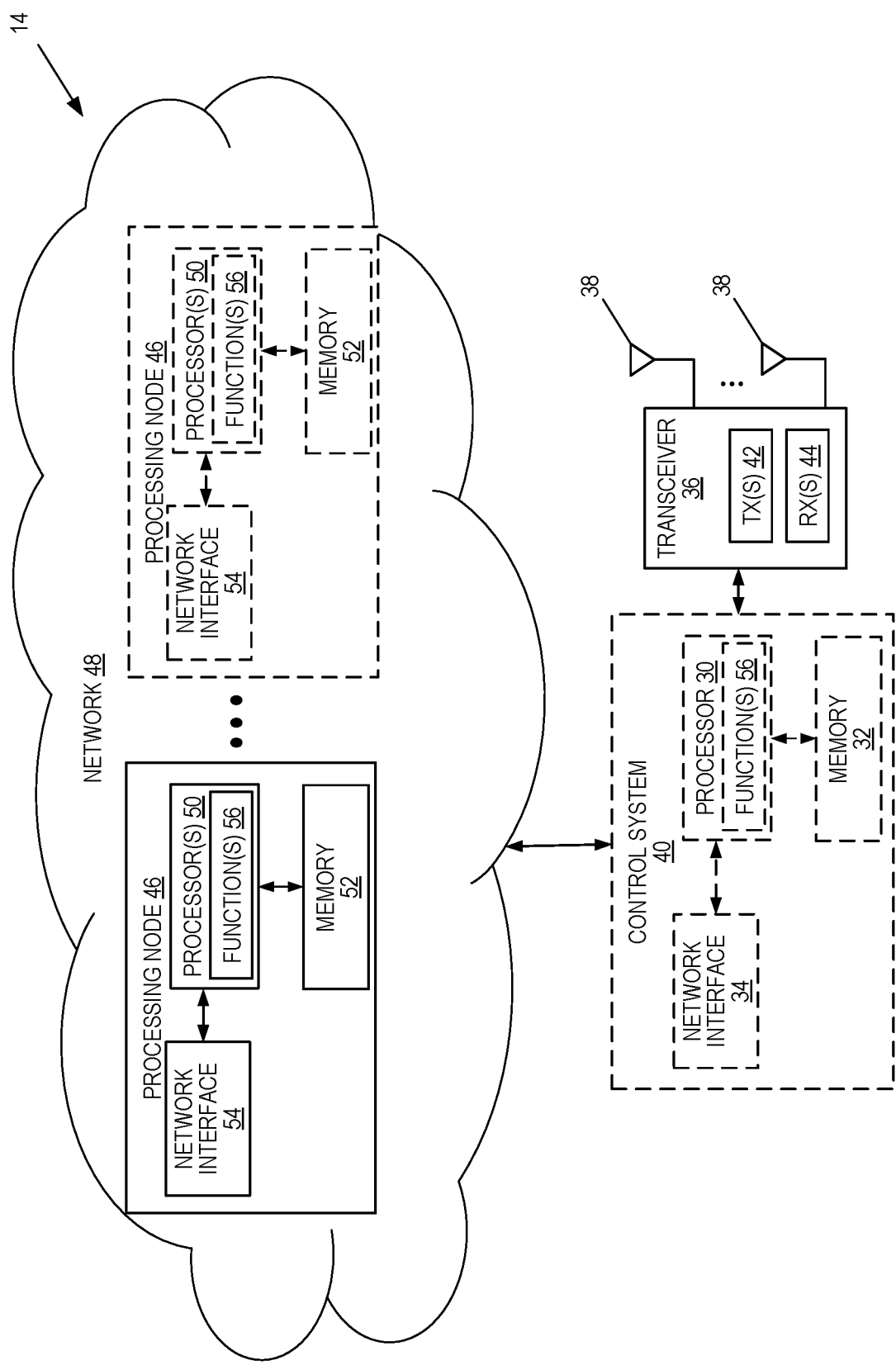

Although the illustrated radio access node 14 (e.g., eNB, base station, or other type of radio access node) may represent network nodes that include any suitable combination of hardware and/or software, these nodes may, in particular embodiments, represent devices such as the example radio access node 14 illustrated in greater detail by FIGS. 7 through 9.

Referring to FIG. 7, a radio access node 14 comprises a node processor 30, a memory 32, a network interface 34, a transceiver 36, and an antenna(s) 38. In certain embodiments, some or all of the functionality described as being provided by a base station, a node B, an eNB, and/or any other type of network node may be provided by the node processor 30 executing instructions stored on a computer-readable medium, such as the memory 32 shown in FIG. 7. Alternative embodiments of the radio access node 14 may comprise additional components to provide additional functionality, such as the functionality described herein and/or related supporting functionality.

FIG. 8 is a schematic block diagram that illustrates a virtualized embodiment of the radio access node 14 according to some embodiments of the present disclosure. As used herein, a "virtualized" radio access node 14 is a radio access node 14 in which at least a portion of the functionality of the radio access node 14 is implemented as a virtual component (e.g., via a virtual machine(s) executing on a physical processing node(s) in a network(s)). As illustrated, the radio access node 14 optionally includes a control system 40 comprising the node processor 30, the memory 32, and the network interface 34, as described with respect to FIG. 7. In addition, the radio access node 14 includes the transceiver 36, as described with respect to FIG. 7. As will be appreciated by one of skill in the art, the transceiver 36 includes one or more transmitters 42 and one or more receivers 44 coupled to the antenna(s) 38. The control system 40 (if present) is connected to one or more processing nodes 46 coupled to or included as part of a network(s) 48 via the network interface 34. Alternatively, if the control system 40 is not present, the transceiver 36 is connected to the one or more processing nodes 46 via a network interface(s). Each processing node 46 includes one or more processors 50 (e.g., CPUs, ASICs, DSPs, FPGAs, and/or the like), memory 52, and a network interface 54.

In this example, functions 56 of the radio access node 14 (e.g., the functions of the eNB, base station, or other type of radio access node) described herein are implemented at the one or more processing nodes 46 or distributed across the control system 40 (if present) and the one or more processing nodes 46 in any desired manner. In some particular embodiments, some or all of the functions 56 of the radio access node 14 described herein are implemented as virtual components executed by one or more virtual machines implemented in a virtual environment(s) hosted by the processing node(s) 46. As will be appreciated by one of ordinary skill in the art, additional signaling or communication between the processing node(s) 46 and the control system 40 (if present) or alternatively the transceiver 36 is used in order to carry out at least some of the desired functions. Notably, in some embodiments, the control system 40 may not be included, in which case the transceiver 36 communicates directly with the processing node(s) 46 via an appropriate network interface(s).

In some particular embodiments, higher layer functionality (e.g., layer 3 and up and possibly some of layer 2 of the protocol stack) of the radio access node 14 may be implemented at the processing node(s) 46 as virtual components (i.e., implemented "in the cloud") whereas lower layer functionality (e.g., layer 1 and possibly some of layer 2 of the protocol stack) may be implemented in the transceiver 36 and possibly the control system 40.

FIG. 9 illustrates another example embodiment of a radio access node 14. As illustrated, the radio access node 14 includes one or more modules 58, each of which is implemented in software. The module(s) 58 provide the functionality of the radio access node 14 (e.g., the functionality of the eNB, base station, or any other type of radio access node) as described herein. In one example, the module(s) 58 include a partitioning module operable to perform the function of step 100 of FIG. 2 and a performing module operable to perform the function of step 102 of FIG. 2. Further, in one example, the partitioning module further includes a selecting module operable to perform the function of step 200 of FIG. 3, a first selecting module operable to perform the function of step 202 of FIG. 3, a second selecting module operable to perform the function of step 204 of FIG. 3, a first forming module operable to perform the function of step 206 of FIG. 3, and a second forming module operable to perform the function of step 208 of FIG. 3. In another example, the partitioning module further includes a selecting module operable to perform the function of step 300 of FIG. 4, a selecting module operable to perform the function of step 302 of FIG. 4, a first forming module operable to perform the function of step 304 of FIG. 4, and a second forming module operable to perform the function of step 306 of FIG. 4.

As indicated by the foregoing, various techniques and technologies are provided for selecting TDD SFs, where both DL and UL sTTI transmissions can be introduced without substantially affecting legacy TDD operations.

While the disclosed subject matter has been presented above with reference to various embodiments, it will be understood that various changes in form and details may be made to the described embodiments without departing from the overall scope of the disclosed subject matter.

The following acronyms are used throughout this disclosure.

3GPP Third Generation Partnership Project
ACK Acknowledgement
ASIC Application Specific Integrated Circuit
BLER Block Error Rate
CPU Central Processing Unit
DL Downlink
DSP Digital Signal Processor
DwPTS Downlink Pilot Time Slot
eNB Enhanced or Evolved Node B
FDD Frequency Division Duplexing
FPGA Field Programmable Gate Array
FS Frame Structure
GP Guard Period
HARQ Hybrid Automatic Repeat Request
HTTP Hypertext Transfer Protocol
kB Kilobyte
LAA License Assisted Access
LTE Long Term Evolution
M2M Machine-to-Machine
MB Megabyte
ms Millisecond
MTC Machine Type Communication
NACK Negative Acknowledgement
OFDM Orthogonal Frequency Division Multiplexing
PHICH Physical Hybrid Automatic Repeat Request Indicator Channel
PUCCH Physical Uplink Control Channel
RAT Radio Access Technology
RTT Round-Trip-Time
SC-FDMA Single Carrier Frequency Division Multiple Access
SF Subframe
SIB System Information Block
sTTI Short Transmit Time Interval
TCP Transmission Control Protocol
TDD Time Division Duplexing
TS Technical Specification
TTI Transmit Time Interval
UE User Equipment
UL Uplink
UpPTS Uplink Pilot Time Slot

What is claimed is:

1. A method of operation of a network node of a cellular communications network, comprising:
    partitioning a plurality of subframes into at least two sets of subframes, the at least two sets of subframes comprising a first set of subframes for legacy Time Division Duplexing (TDD) transmissions and a second set of subframes for short Transmit Time Interval (sTTI) TDD transmissions, wherein partitioning the plurality of subframes comprises:
    selecting at least one downlink subframe index;
    selecting all mandatory uplink subframe indices that are predefined as being mandatory uplink subframe indices corresponding to the at least one downlink subframe index;
    selecting zero, one, or two or more optional uplink subframe indices that are predefined as being optional uplink subframe indices corresponding to the at least one downlink subframe index;
    forming the first set of subframes for legacy TDD transmissions using the at least one downlink subframe index, the mandatory uplink subframe indices, and the zero, one, or two or more optional uplink subframe indices; and
    forming the second set of subframes for sTTI TDD transmissions using a complement of the first set of subframes within a radio frame; and
    performing one or more telecommunications functions according to the at least two sets of subframes.

2. The method of claim 1 wherein the one or more telecommunications functions comprise scheduling.

3. The method of claim 1 wherein the plurality of subframes is a plurality of subframes in a radio frame.

4. The method of claim 1 wherein the at least two sets of subframes are the same for all radio frames within a defined time period.

5. The method of claim 1 wherein the at least two sets of subframes are the same for all radio frames within a defined time period.

6. The method of claim 1 wherein the at least two sets of subframes vary from one radio frame to another in accordance with a predefined pattern.

7. The method of claim 1 wherein the first set of subframes comprise an uplink subframe index for legacy uplink transmission whose corresponding retransmission subframe index is the same as the uplink subframe index.

8. The method of claim 1 wherein the second set of subframes comprises at least one downlink subframe for legacy downlink transmission and/or at least one special subframe for legacy TDD operation.

9. The method of claim 1 wherein partitioning the plurality of subframes into the at least two sets of subframes comprises partitioning the plurality of subframes into the at least two sets of subframes based on at least one criteria selected from a ratio of legacy wireless devices and sTTI wireless devices and a ratio of downlink and uplink traffic of legacy wireless devices.

10. A method of operation of a network node of a cellular communications network, comprising:
    partitioning a plurality of subframes into at least two sets of subframes, the at least two sets of subframes comprising a first set of subframes for legacy Time Division Duplexing (TDD) transmissions and a second set of subframes for short Transmit Time Interval (sTTI) TDD transmissions, wherein partitioning the plurality of subframes into the at least two sets of subframes comprises:
        selecting at least one uplink subframe index;
        selecting zero, one, or two or more downlink subframe indices that are predefined as optional downlink subframe indices corresponding to the at least one uplink subframe index;
        forming the first set of subframes for legacy TDD transmissions using the at least one uplink subframe index and the zero, one, or two or more downlink subframe indices; and
        forming the second set of subframes for sTTI TDD transmissions using a complement of the first set of subframes within a radio frame; and
    performing one or more telecommunications functions according to the at least two sets of subframes.

11. The method of claim 10 wherein the at least two sets of subframes vary from one radio frame to another in accordance with a predefined pattern.

12. A network node for a cellular communications network, comprising:
    a processor; and
    memory comprising instructions executable by the processor whereby the network node is operable to:
        partition a plurality of subframes into at least two sets of subframes, the at least two sets of subframes comprising a first set of subframes for legacy Time Division Duplexing (TDD) transmissions and a second set of subframes for short Transmit Time Interval (sTTI) TDD transmissions, wherein the network node is operable to partition the plurality of subframes into the at least two sets of subframes by:
            selecting at least one downlink subframe index;
            selecting all mandatory uplink subframe indices that are predefined as being mandatory uplink subframe indices corresponding to the at least one downlink subframe index;
            selecting zero, one, or two or more optional uplink subframe indices that are predefined as being optional uplink subframe indices corresponding to the at least one downlink subframe index;
            forming the first set of subframes for legacy TDD transmissions using the at least one downlink subframe index, the mandatory uplink subframe indices, and the zero, one, or two or more optional uplink subframe indices; and
            forming the second set of subframes for sTTI TDD transmissions using a complement of the first set of subframes within a radio frame; and
        perform one or more telecommunications functions according to the at least two sets of subframes.

13. The network node of claim 12, wherein the at least two sets of subframes are the same for all radio frames within a defined time period.

14. The network node of claim 12, wherein the at least two sets of subframes are the same for all radio frames within a defined time period.

15. The network node of claim 12, wherein the first set of subframes comprise an uplink subframe index for legacy uplink transmission whose corresponding retransmission subframe index is the same as the uplink subframe index.

16. The network node of claim 12, wherein the second set of subframes comprises at least one downlink subframe for legacy downlink transmission and/or at least one special subframe for legacy TDD operation.

17. The network node of claim 12, wherein partitioning the plurality of subframes into the at least two sets of subframes comprises partitioning the plurality of subframes into the at least two sets of subframes based on at least one criteria selected from a ratio of legacy wireless devices and sTTI wireless devices and a ratio of downlink and uplink traffic of legacy wireless devices.

18. A network node for a cellular communications network, comprising:
    a processor; and
    memory comprising instructions executable by the processor whereby the network node is operable to:
        partition a plurality of subframes into at least two sets of subframes, the at least two sets of subframes comprising a first set of subframes for legacy Time Division Duplexing (TDD) transmissions and a second set of subframes for short Transmit Time Interval (sTTI) TDD transmissions, wherein the network node is further operable to partition the plurality of subframes into the at least two sets of subframes by:
            selecting at least one uplink subframe index;
            selecting zero, one, or two or more downlink subframe indices that are predefined as optional downlink subframe indices corresponding to the at least one uplink subframe index;
            forming the first set of subframes for legacy TDD transmissions using the at least one uplink subframe index and the zero, one, or two or more downlink subframe indices; and
            forming the second set of subframes for sTTI TDD transmissions using a complement of the first set of subframes within a radio frame; and perform one or more telecommunications functions according to the at least two sets of subframes.

19. The network node of claim 18, wherein the at least two sets of subframes vary from one radio frame to another in accordance with a predefined pattern.

\* \* \* \* \*